March 25, 1930.                 W. HORRA                    1,752,001
          METHOD OF MAKING A CHOCOLATE COVERED CONFECTION
                    HAVING A LIQUID MASS THEREIN
                        Filed Jan. 29, 1929
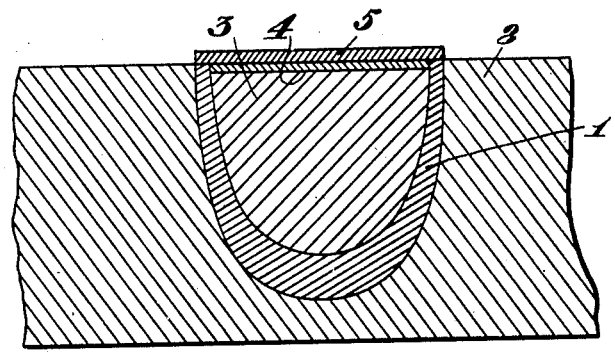
Inventor.
Wenzel Horra
by
Mock & Blum
Attorneys Patented Mar. 25, 1930

1,752,001

UNITED STATES PATENT OFFICE

WENZEL HORRA, OF BERLIN-TEMPELHOF, GERMANY, ASSIGNOR TO THE FIRM: SAROTTI AKTIENGESELLSCHAFT, OF BERLIN-TEMPELHOF, GERMANY

METHOD OF MAKING A CHOCOLATE-COVERED CONFECTION HAVING A LIQUID MASS THEREIN

Application filed January 29, 1929. Serial No. 335,927.

The invention relates to chocolate covered candies and particularly to that type having liquid contents.

The drawing diagrammatically shows the improved chocolate confection and the method of making the same. For convenience, it is assumed that the open mouth of the chocolate shell is held upwards so that the axis of the chocolate shell is vertical. However, it would not be necessarily departing from the invention if the axis of the chocolate shell were held inclined to the vertical position.

According to the invention heated chocolate is poured into a mould which is open at its top. The mould with the chocolate is shaken on the shaking table. Or, if desired, the mould is inverted whereby the chocolate which is not quite stiff partially flows out. The central part of the molten chocolate can flow out while the chocolate adjacent to the walls of the mould becomes stiff so that a hollow chocolate body is formed. Or, if desired, the mould is again inverted so that the chocolate which is not yet quite stiff flows to the bottom of the chocolate shell, whereby the bottom of the mould becomes relatively thick while the edge of the shell body remains relatively thin. This hollow body or shell of chocolate is now filled with the desired content, and the opening of the hollow body is closed by a layer of heated chocolate. The layer of heated chocolate can be put in a well known manner on a paper strip and this layer is brought on the opening of the hollow body by inverting the paper strip.

In order to have a better connection between the chocolate layer or closure and the shell of chocolate, the open edge of the shell may be sprinkled with heated chocolate before the above mentioned layer of chocolate is put on the shell. By this method a thin chocolate cover is first formed and the final chocolate layer is put on this preliminary cover formed by sprinkled chocolate.

A hollow body of chocolate manufactured according to the invention is shown by way of example in the accompanying drawings. The shell 1 is formed in the mold 2 on the shaking table. The drawing shows the mould in a position with the opening of the hollow body of chocolate at its top. As can be seen from the drawing the wall of the hollow body of chocolate is thickest at the bottom of the mould while the remainder of the wall is tapered and the rim is sharply defined. The hollow body of chocolate is filled with liquid content 3. The opening of the hollow body of chocolate 1 is sprinkled with heated chocolate so that a chocolate cover 4 is built. On this thin chocolate cover 4 a second chocolate layer 5 is put. By means of these two layers the opening of the hollow body of chocolate is closed accurately.

This sprinkled cover 4 also may be omitted.

What I claim is:

1. A method of making an article of candy comprising a chocolate shell having a liquid mass which consists in shaking a mold containing molten chocolate while said mold is held with its opening upwards, permitting part of the liquid chocolate to flow out of the mold, filling the chocolate shell thus formed with the desired liquid mass, sprinkling heated chocolate on the top of said liquid mass to form a preliminary cover, and then forming a second cover of chocolate on the rim of said chocolate shell.

2. A method of forming a chocolate confection having a liquid mass therein which consists in placing the liquid mass within the open chocolate shell, forming a preliminary closure of chocolate on the top of said liquid mass and within the rim of said chocolate shell, and then forming a second cover of chocolate which contacts with and is located above the rim of said chocolate shell.

In testimony whereof I affix my signature.

WENZEL HORRA.